United States Patent [19]
Dinkins

[11] Patent Number: 5,790,936
[45] Date of Patent: Aug. 4, 1998

[54] LOW POWER SUBSCRIBER UNIT TRANSMITTING VOICE MESSAGES IN A TWO-WAY COMMUNICATION SYSTEM

[75] Inventor: Gilbert M. Dinkins, Herndon, Va.

[73] Assignee: EON Corporation, Reston, Va.

[21] Appl. No.: 315,150

[22] Filed: Sep. 29, 1994

Related U.S. Application Data

[63] Continuation-in-part of Ser. No. 257,336, Jun. 8, 1994, abandoned, and Ser. No. 966,414, Oct. 26, 1992, Pat. No. 5,388,101.

[51] Int. Cl.[6] .............................. H04N 1/00; H04N 7/14; H04B 3/36; H04J 3/16
[52] U.S. Cl. ............................. 455/5.1; 348/10; 348/12; 348/13; 348/14; 370/95.1; 370/97; 455/53.1
[58] Field of Search .................. 348/1, 2, 6, 7, 348/8, 10, 12, 13, 14, 15, 16; 455/2, 3.1, 3.2, 5.1, 6.1, 33.1, 53.1, 54.1, 56.1, 6.2, 6.3; 379/58–63; 370/71, 73, 75, 95.1, 95.3, 97, 104.1; H04N 7/10, 7/14

[56] References Cited

U.S. PATENT DOCUMENTS

| | | |
|---|---|---|
| 4,591,906 | 5/1986 | Morales-Garza et al. ............... 358/84 |
| 4,750,036 | 6/1988 | Martinez ................................. 348/12 |
| 4,755,871 | 7/1988 | Morales-Garza et al. ............... 358/84 |
| 5,036,389 | 7/1991 | Morales ................................. 358/84 |
| 5,101,267 | 3/1992 | Morales-Garza ...................... 358/84 |
| 5,388,101 | 2/1995 | Dinkins ................................. 370/95.1 |
| 5,481,546 | 1/1996 | Dinkins ................................. 370/95.1 |

*Primary Examiner*—John K. Peng
*Assistant Examiner*—John W. Miller
*Attorney, Agent, or Firm*—Cushman Darby & Cushman IP Group of Pillsbury Madison & Sutro LLP

[57] ABSTRACT

An interactive data appliance (IDA) having a receiver and transmitter for sending voice packet messages in a two-way interactive broadcast data service communication system. The IDA contains a receiver into which a user recites a spoken message. The voice message is then transmitted by the IDA to a local remote receiver and then to a central transmitting station. In one embodiment of the invention, the IDA digitizes the voice message recited by the user. Additionally, in one embodiment, the IDA operates on a carrier frequency band in the order of approximately 218 MHz, is a battery operated portable unit, and has a maximum power output in the milliwatt range.

28 Claims, 15 Drawing Sheets

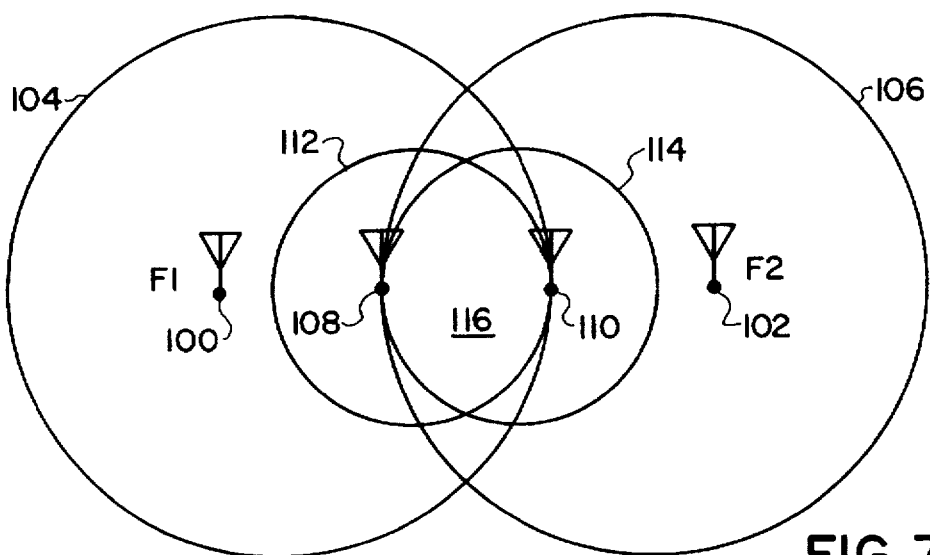
FIG. 7
| | CTS 100 | CTS 102 |
|---|---|---|
| BROADCAST | F1 | F2 |
| REMOTE RECEIVER | | |
| SETUP | F1 | F2 |
| DATA | F2 | F3 |
| • | F3 | F4 |
| • | • | • |
| • | • | • |
| • | • | F14 |
| • | F14 | F1 |
FIG. 8
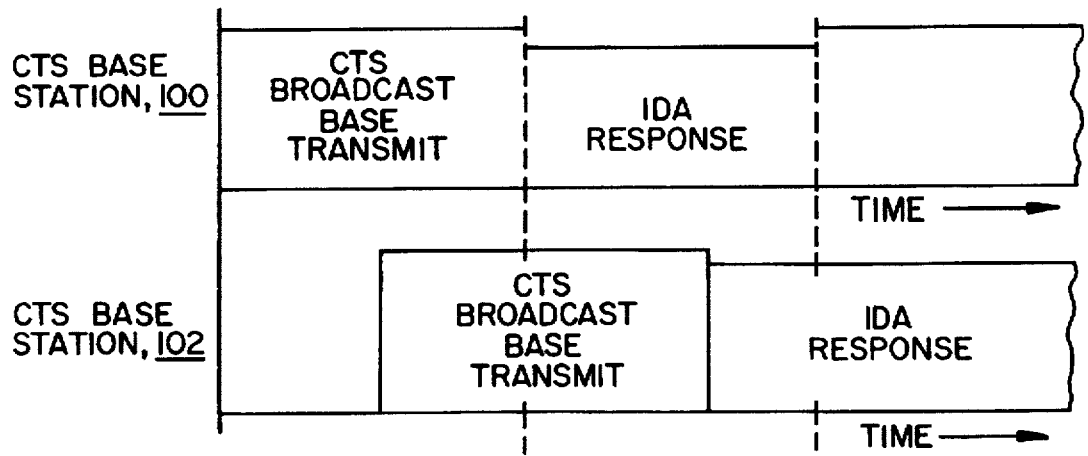
FIG. 9

LOW POWER SUBSCRIBER UNIT TRANSMITTING VOICE MESSAGES IN A TWO-WAY COMMUNICATION SYSTEM

This is a Continuation-In-Part of a application Ser. No. 08/257,336, filed Jun. 8, 1994 entitled "GPS Synchronization of CTS Transmitters for an Interactive Network", now abandoned. This Application is also a Continuation-In-Part of copending application Ser. No. 07/966,414, filed Oct. 26, 1992, by G. Dinkins, entitled "Interactive Nationwide Data Service Communication System For Stationary And Mobile Battery Operated Subscriber Units" now U.S. Pat. No. 5,388,101.

TECHNICAL FIELD

This invention relates to an interactive two-way data service network, and more particularly, to voice packet messaging in an interactive two-way data service network.

BACKGROUND ART

A wireless interactive video system disclosed in U. S. Pat. No. 4,591,906, May 27, 1986, by Fernando Morales-Garza, et al. provides for real time interactive digital communication from a large audience of subscribers in urban areas in the vicinity of a central television transmitting station.

The Federal Communications Commission (FCC) has now established in the U.S.A. communication standards for interactive data service. Specifically, wireless transmissions in the 218–219 MHz band have been allocated by the FCC for licensing for public use in assigned local central transmitting station (CTS) areas authorizing low power subscriber interaction units of maximum effective radiated power under twenty watts.

Wireless interactive video data service is provided without telephone lines or cable systems over a nationwide network of CTSs in the manner disclosed in U.S. Pat. No. 5,101,267, Mar. 31, 1992, Fernando Morales. The Morales Patent describes satellite transmissions between local area CTSs and a data center with a wireless connection being provided to responding units, or remote transmitter units (RTU) and the local area CTSs.

This nationwide communication capability permits live video programs viewed nationwide, such as world series baseball games, to become interactive for individual subscriber participation. Thus, mass communications over a substantially real time communication system, with large enough urban area audience participation to jam any existing public telephone switching network capability, are made feasible.

Each local CTS in such a nationwide communication system must be capable of interacting within designated license restrictions in the presence of peak local audience participation without significant switching delays. In so doing, substantially real time interactive two-way connections over a network processing an audience of very large numbers of participants communicating substantially simultaneously can be established.

Prior art two-way radio frequency transmission network technology, as represented for example by portable telephone communication systems, is generally incompatible with efficient substantially real time communication in the presence of heavy subscriber activity. This is due to the fact that in telephone systems, switching and connection operations must be made compatible with switching instructions from subscriber instruments with coded audio tones at audio frequencies accompanying analog audio messages. Hence, manual entering of long numeric identification numbers, typically ten decimal digits, for nationwide long distance connections busies standard phone lines. As a result, as users attempt to complete point-to-point connections as a part of the interconnecting signal data, switching circuits are engaged for very long periods of time inconsistent with substantially real time connections. Accordingly, busy signals are often encountered thereby restricting the size of a participating audience for immediate connection. As such, necessary re-dialing frustrates the potential using audience. Thus, interactive response that requires telephone exchange communications tends to be delayed and discouraging to participants. Similarly, even with the restricted amount of digital data that might be transferred in digital paging system messages, where typically some messages only indicate a short fixed length message such as a calling telephone number, there is little possibility of approaching real time communications in the presence of heavy traffic. This occurs because of the complexities of the necessary telephone switching networks employed for conveying messages.

In order to process digital information accurately, efficiently, and privately, it is necessary to precisely time and organize the digital data and accompanying commands. For real time two-way digital communications with large audiences wanting prompt access to the message conveyance system or network, synchronous signal timing becomes critical and absolutely necessary for real time interactive communication. In general, audio telephone communications are of an analog nature not critical to timing and are conveyed asynchronously. Thus, prior telephone art signal communication systems are unsuited for adoption in interactive video data systems that convey private point-to-point digital messages on a real time basis for large audiences.

A co-pending related patent application Ser. No. 07/966, 414, filed Oct. 26, 1992, by G. Dinkins, entitled "Interactive Nationwide Data Service Communication System For Stationary And Mobile Battery Operated Subscriber Units" discloses a two-way interactive communication network. The system disclosed in that Application includes a network switching center and provides point-to-point communications between subscriber units at different geographic locations. The network switching center, or hub, is connected via satellite links to a plurality of local CTSs. The local CTSs communicate over an RF link with a number of low-power subscriber units. The low-power subscriber units, are, for example, battery-operated mobile units. The local subscriber units, or remote transmitter units (RTUs), for this system are each located in the vicinity of a CTS. The local RTUs are adapted for synchronous time-division-duplexed receipt and transmission of digital messages. The digital messages are transmitted to and from the local RTUs through different paths. A RTU is also referred to as an interactive data appliance (IDA). An IDA is a general term which includes subscriber video stations, digital alarms, or the like.

For transmitting digital messages to a RTU or IDA from a CTS, the digital messages are transmitted at relatively high power (in the tens of watts range) from a local CTS to the RTU or IDA. The RTU or IDA is, typically, an inexpensive, low-power, mobile, small-sized, device. Digital messages are transmitted from these low-power RTUs or IDAs at relatively low power (in the milliwatt range) to the CTS using an intermediate set of remote receiver units. The low-power IDAs transmit at milliwatt power levels and the system incorporating such low-power, milliwatt IDAs is called a Milliwatt System.

The intermediate remote receiver units are distributed around a local CTS. The remote receiver receives messages from various low-power subscriber IDAs and communicate with the data processing facility of a CTS using, for example, a wired communication link such as a cable. Messages are compiled as data packets in the data processing facility of the CTS and relayed via satellite links to the network switching center. The Milliwatt System uses time division duplex for the outbound signals transmitted from the local CTS to the local IDAs and for the inbound signals transmitted from the local IDAs to the remote receivers located around the local cell sites. Transmissions in the system alternate between outbound signals and inbound signals.

Additionally, to provide adequate signal coverage, interactive systems must be designed such that two adjacent CTS cell sites have certain common coverage areas with overlapping signal coverage. These coverage-overlap areas between two adjacent CTS cell sites receive signals of approximately equal signal strength from both of the CTS cell transmitters. Because time division multiplexing is used to separate the two transmitting functions, it should be appreciated that the timing between the transmitting and receiving time slots is very important to prevent interference. The interactive video system of co-pending patent application Ser. No. 07/966,414, filed Oct. 26, 1992, by G. Dinkins, entitled "Interactive Nationwide Data Service Communication System For Stationary And Mobile Battery Operated Subscriber Units" has a timing accuracy of 50 milliseconds ±20 milliseconds. If both CTSs are allowed to transmit in a relatively random fashion, it is likely that one base cell site may be transmitting on a given frequency while an adjacent CTS is attempting to listen to responses from its local subscriber IDA units on the same frequency. This situation causes interference between the two adjacent systems.

Another copending application Ser. No. 08/257,336, filed Jun. 8, 1994 entitled "GPS Synchronization of CTS Transmitters for an Interactive Network" discloses synchronizing all of the CTSs together using a Global Positioning System (GPS) to provide a very precise time stamp at each CTS. With such a system, accuracy of 1 to 4 microseconds is achieved.

Using the GPS, a precise time signal, or time stamp, is made available locally at each CTS to synchronize a system according to the invention. By synchronizing the start-of-transmission time for all of the CTSs in the system, interference is avoided. The signaling protocol for a system according to the invention used time-division-duplexing. In the Broadcast Mode, an outbound signal sends information from a network switching center, or hub, via a satellite link to a CTS, and then to an IDA. In the Response Mode, an inbound signal sends response information from an IDA to a remote receiver, then to a CTS, and then via a satellite link back to the switching center, or hub.

IDAs located in the region of overlapping coverage, which are located between two CTSs, receive signals of approximately equal strength from each of the CTSs. If each CTS is permitted to randomly start its broadcast transmissions, interference results if one CTS is in the Broadcast Mode and if the another CTS is in the Response Mode attempting to listen to a response from an IDA on the same frequency. The precise time stamp made locally available at each CTS by the GPS system is used to accurately synchronize the various CTSs of an interactive video system.

The CTSs and IDAs operate in a band of carrier frequencies, for example, between 218-219 MHz. Each of the local IDAs is individually identified by reception and transmission of digital address signal pulses in a predetermined timing relationship synchronized with the precision clock signal. The CTSs and IDAs hand-off a communication message for transmission over a path through a single one of the cell subdivision receive-only stations. The IDAs transmit on a plurality of frequencies, and the receive-only intermediate receivers at different subdivision sites operate on different ones of said frequencies within the 218-219 MHz band.

A plurality of CTSs are provided in the network according to the system. The CTS transmission facilities are synchronized with a precision clock signal derived from an independent precision clock source such as a GPS network to provide precision timing for the CTS transmission facilities.

However, all of the aforementioned interactive systems, have IDA which require some sort of manual input by the user. For example, if a user wishes to order a product, the user must type into the IDA the specifications of his or her selection using keys arranged on the IDA. As another example, if a user wishes to "play-along" with a game show, the user must type his or her answer onto the IDA or push a button corresponding to the user's chosen answer. As such, the level of excitement and some of the complete "interactivity" desired is lost to the user. Consequently, the need has arisen for an IDA to be used in conjunction with an interactive broadcast data service, wherein the IDA does not significantly reduce the level of excitement and some of the complete "interactivity" desired in such interactive broadcast data services.

DISCLOSURE OF THE INVENTION

It is therefore an object of the invention to provide an IDA to be used in conjunction with an interactive broadcast data service, wherein the IDA does not significantly reduce the level of excitement and some of the complete "interactivity" desired in such interactive broadcast data services. This object has been achieved with an IDA having a voice packet messaging system integrated therein.

In one embodiment of the present claimed invention, an IDA has a receiver and transmitter for sending voice packet messages in a two-way interactive broadcast data service communication system. The IDA contains a receiver into which a user recites a spoken message. The voice message is stored for later transmission by the IDA to a local remote receiver and then to a central transmitting station. Thus, the user can, for example, order merchandise or play along with TV game show simply by speaking into the receiver on the IDA. In one embodiment, the user's spoken message is digitized and is then transmitted to a local remote receiver and then to a central transmitting station. Additionally, in one embodiment, the IDA operates on a carrier frequency band in the order of approximately 218 MHz, is a battery operated portable unit, and has a maximum power output in the milliwatt range.

In another embodiment, the user's spoken message is digitized, stored, transmitted to a local remote receiver, and then to a central transmitting station. This message is routed to the destination address by the CTS if within the cell or by the hub if the addressee is in another cell. The addressed IDA retrieves the digital message and converts it back to voice at the addressee's IDA.

As such, the present claimed invention provides an IDA which does not require extensive manual input by the user. For example, if a user wishes to order a product, the user simply speaks into the IDA, and recites the specifications of his or her selection. As another example, if a user wishes to "play-along" with a game show, the user speaks his or her answers into the IDA. In so doing, the level of excitement and the "interactivity" of an interactive broadcast data service is substantially enhanced.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7 is a diagrammatic view of two adjacent cell CTSs with overlapping coverage areas.

FIG. 8 is a chart showing the frequencies used by two adjacent cell CTSs.

FIG. 9 shows respective timing charts for two unsynchronized, adjacent cell CTSs.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
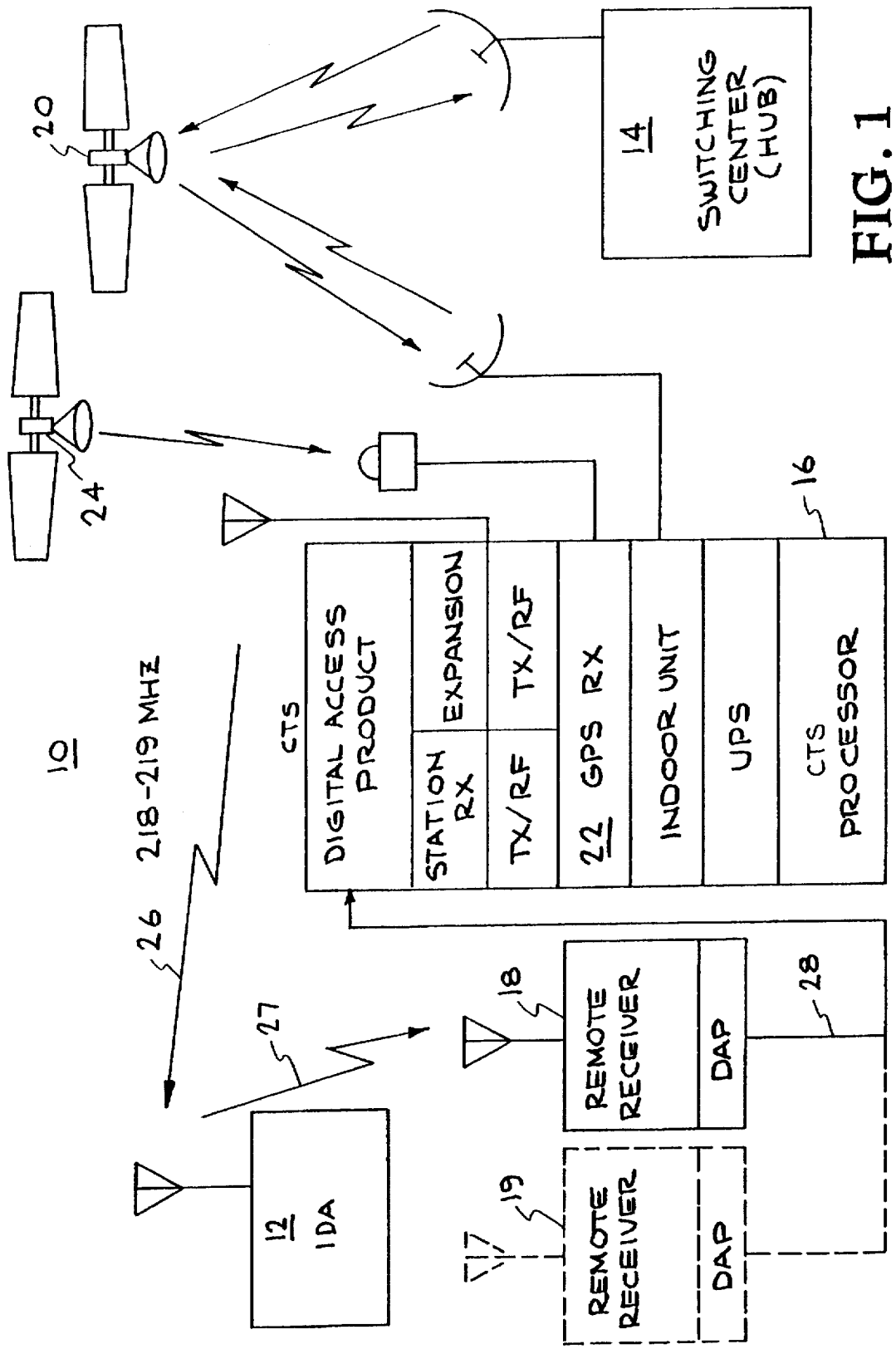
FIG. 1 is a block diagram of an interactive data satellite system which provides point-to-point communications between IDAs in local service areas and a national hub.

With reference next to FIG. 1, a block diagram of an interactive broadcast data system 10 is shown. This system 10 provides point-to-point communications between a number of subscriber units/remote transmitter units or "interactive data appliances" (IDAs), typically shown as 12, and a national switching center, or hub, 14. The IDAs 12 may be stationary units or mobile units. The system 10 includes a number of geographically distributed CTSs 16 each having several adjacently located remote receiver units 18, 19. The CTS 16 has two-way communication with the switching center 14 via two-way satellite links to a satellite 20. The CTS 16 includes data and switching control capabilities.

With reference still to FIG. 1, in one embodiment of the present invention, information is transmitted to and from a IDA 12 using two different signal paths. The CTS 16 transmits information to the IDA 12 using a 218–219 MHz RF link 26. The IDA 12 transmits information back to the CTS 16 using a remote receiver unit 18. The IDA 12 transmits information to the remote receiver unit 18 using another 218–219 MHz RF link 27. The power level of the transmitter of the IDA 12 is in the milliwatt range. The remote receiver unit 18 then transmits the information to the CTS 16 using, for example, a hard-wired data link 28. The CTS 16 then communicates the information received from the IDA 12 to the switching center 14 via the satellite 20.

A co-pending patent application Ser. No. 07/966,414, filed Oct. 26, 1992, by G. Dinkins, entitled "Interactive Nationwide Data Service Communication System For Stationary And Mobile Battery Operated Subscriber Units" is incorporated herein by reference as background material. This reference discloses a two-way interactive video communication network which uses IDAs having milliwatt transmitter output power. The basic operation of this type of video interactive system is set forth in U.S. Pat. Nos. 4,591,906 and 5,101,267. Details of point-to-point switching and communication throughout the system identified at switching and control center 14 and an accompanying terminal directory, downloading of data and software from the control center, the processing of billings and transactions, and the corresponding interaction of the memory and software at the IDA 12 are set forth in co-pending applications Ser. No. 07/889,626, May 28, 1992 entitled "Software Controlled Interactive Video Network" and Ser. No. 07/932,241, Aug. 19, 1992 entitled "Interactive Satellite Broadcast Network", which are also incorporated herein by reference as background material.

Figure 2:
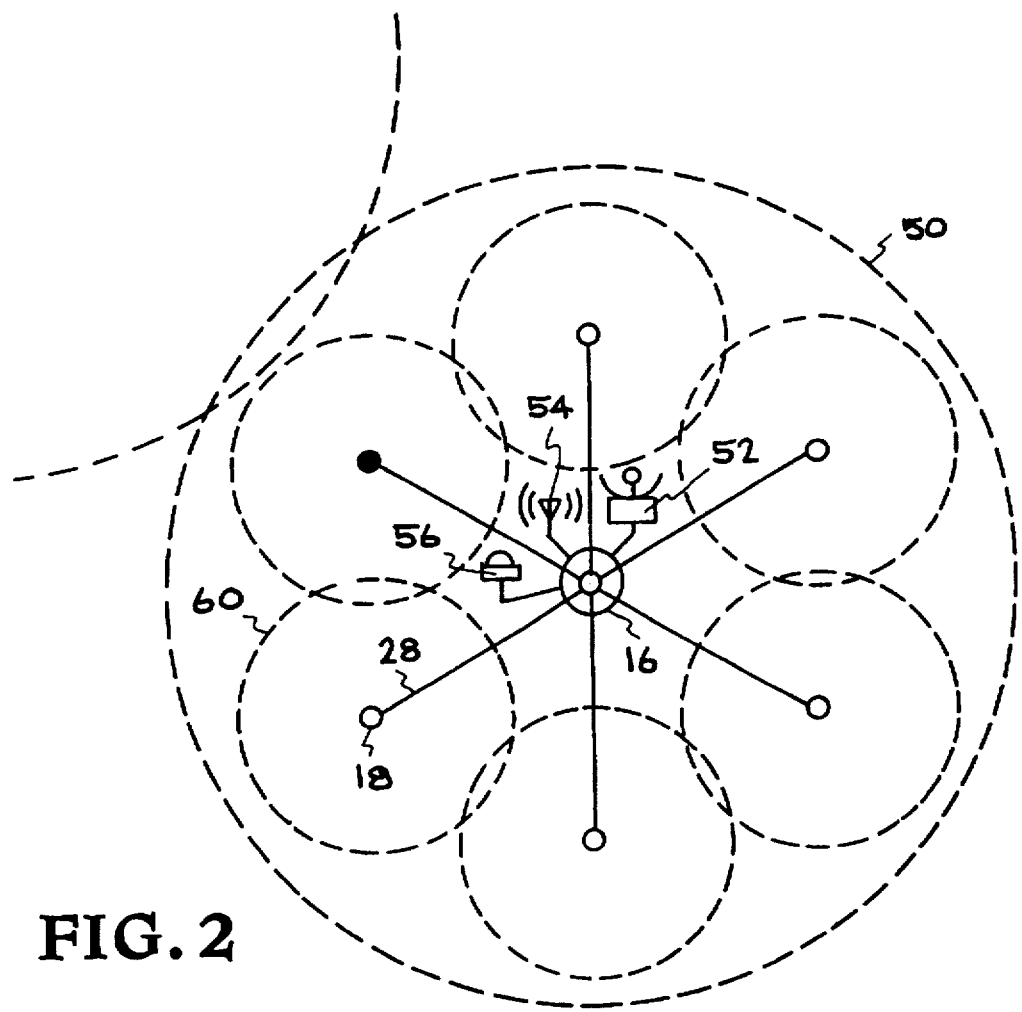
FIG. 2 is a diagram showing the location of remote receivers around a cell CTS.

With reference next to FIG. 2, an embodiment is diagrammatically shown of an explicit CTS 16 which expands the interactive capabilities and functions of the IDAs, not shown, while improving performance and reducing cost. The outer dotted ring 50 outlines the limits of a local CTS 16, such as may be licensed by the FCC for interactive broadcast data service. The CTS 16 communicates with the satellite system via directed dish antenna 52, and transmits digital communication signals and broadcast signals to a set of IDAs throughout the assigned territory within the dotted boundary ring 50 by way of an antenna 54. Another antenna 56 receives GPS signals from GPS satellites to provide precision time signals for the CTS 16.

With reference again to FIG. 2, a set of typically 14 remote, receive-only, fixed-location relay stations 18 are positioned at strategic locations within the CTS cell area defined by ring 50. Each remote receiver 18 is connected by cable, RF link or leased telephone line 22 to the CTS 16. Thus, IDAs etc., located within a subdivided response zone 60 communicate with the remote receivers 18 over a significantly reduced transmission path distance within the subdivided response zones 60, as compared with direct transmission to CTS 16. This subdivision feature provides for reliable transmission in an interactive broadcast data system at radiated power levels in the milliwatt region. Distinct advantages result, including less chance for external interference and long life battery operated mobile IDAs, not shown, which can be moved throughout the cell territory defined by ring 50.

With reference still to FIG. 2, up to 14 remote receivers 18 are used per CTS 16. Each remote receiver 18 has a subdivided response zone 60 with a typical radius of one mile. The subdivided response zone 60 can contain 5000 households, each of which may contain IDAs. The data rate from CTS 16 to an IDA in a subdivided response zone 60 is 12 kilobits per second. The data rate from an IDA to remote receiver 18 is 6.4 kilobits per second. The data rate from CTS 16 to satellite 20 is 128 kilobits per second, and the data rate from satellite 20 to CTS 16 is 512 kilobits per second.

Accordingly, this invention encourages additional interactive services such as, for example, meter reading and inventory control in soft drink dispensing machines. The manpower and expenses saved using the present claimed invention render activities such as the aforementioned meter reading and inventory control economically viable in an interactive broadcast data service system. Furthermore, with full service broadcast reception possible throughout the location of an IDA, the feasibility of moving such IDAs to different locations within a house, office, or car is established. Accordingly this invention is in part directed to providing portable or mobile IDAs and communication units for interactive broadcast data service systems compatible with FCC standards. Smaller and mobile battery powered IDAs are also possible. By having transmitting power levels of the IDAs in the milliwatt region, the present invention achieves considerably longer battery life.

A further substantial advantage to the invention is the ability to handle point-to-point connections nationwide under peak traffic conditions with very little IDA waiting time for access to the system.

Figure 3:
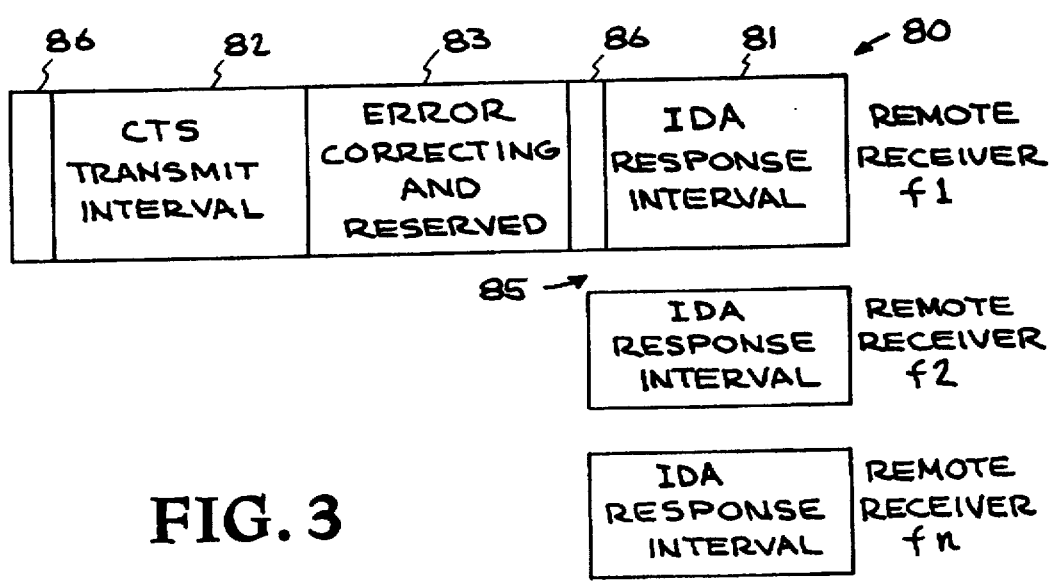
FIG. 3 is a chart form illustrating the system protocol for reception of messages and response at the IDAs.

Referring now to FIG. 3, the system protocol for reception of messages and response at the IDAs is illustrated in chart form. A large number, typically 14, of IDAs can be using the system simultaneously at any CTS site. Thus, assume that each of 14 fixed remote receivers within the CTS cell area is capable of processing one IDA at a time. Typically, 10 IDAs are able to complete their communications with their respective remote receivers in one second. Thus, in a CTS handling 14 remote receivers, 140 IDAs can complete their communications in one second. Such communication times are possible because the milliwatt powered IDAs are adapted for transmission in a single one of the 14 subdivided areas or zones, with provisions for preventing interference with adjacent zones.

Referring again to FIG. 3, a few of the advantages realized by the present invention are: (1) that low power IDAs use the system at outer cell boundaries, thereby reducing chances for inter-cell interference, (2) that the expansion of the system may occur by adding subdivided zones as the number of IDA users grow, (3) that the passive remote receivers do not experience problems in meeting FCC interactive data service conditions, (4) and that capital, power, and operating costs required in interactive broadcast systems is substantially decreased.

With reference again to FIG. 3, to transmit with ten IDAs in the respective zones, the protocol assigns a timed broadcast period 80 to an IDA having a response at an accumulated 6.4 kilo baud response rate. Each of these switched-in IDAs then transmits a digital message superimposed by modulation on the 218–219 MHz band sub carrier. The broadcast time interval 82 permits the cell site transmitter to broadcast a message including a (ringing) signal that may include an address code number for activating a single IDA within the cell area. Each IDA has a built in address code that must be used to activate that IDA, and the central data switch control unit maintains a directory of all such numbers in the nationwide network. The broadcast time interval 83 provides a time gap for checking errors and for providing desirable control signals. Guard gaps 86 are supplied between successive broadcast periods, where these broadcast periods are also identifiable as RF frames.

Referring still to FIG. 3, the RF frames permit transmission at 6.4 Kilo baud for each of say 14 subdivided response zones 60 of FIG. 2. Thus, the CTS stores in a buffer the 14 multiplexed IDA data rates to load the buffer at a 71 Kilo baud rate. A total data rate for the main CTS is 71 Kilo baud from the 14 simultaneous responses from the separate subdivided response zones 60. Assuming no errors and 50 byte messages from each IDA, with 6,000 IDAs trying to get their message through 14 channels, the waiting time for a "line" would be less than one minute without contention, minimizing the necessity of "redialing".

With reference still to FIG. 3, the legends in the right hand column show that each remote receiver is assigned a corresponding communication frequency band, $f_1$-$f_n$, thereby isolating the communications from IDAs in each subdivision within the CTS cell site. The length of the RF frames 80 is 100 milliseconds including a guard band 86 to switch the hardware from receive mode to transmit mode or from transmit mode to receive mode.

Figure 4:
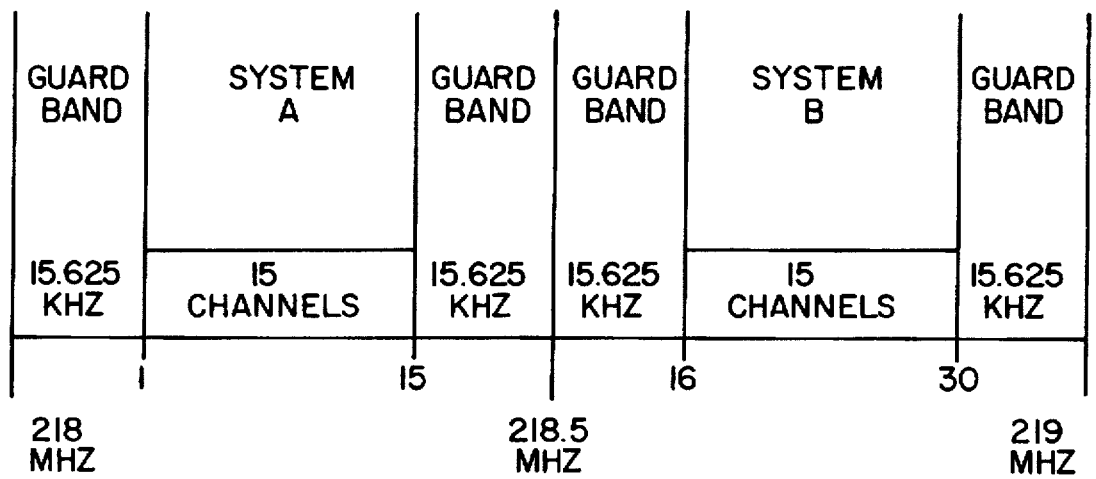
FIG. 4 is a diagram showing the allocation of frequencies for transmission from a cell CTS to IDAs.

With reference next to FIG. 4, a diagram illustrating the allocation of frequencies for transmission from a cell CTS to IDAs is shown. This diagram sets forth the FCC approved bands for licensed interactive communications, thus allocating fifteen channels, each having a bandwidth capable of carrying the messages under the conditions described herein.

Figure 5:
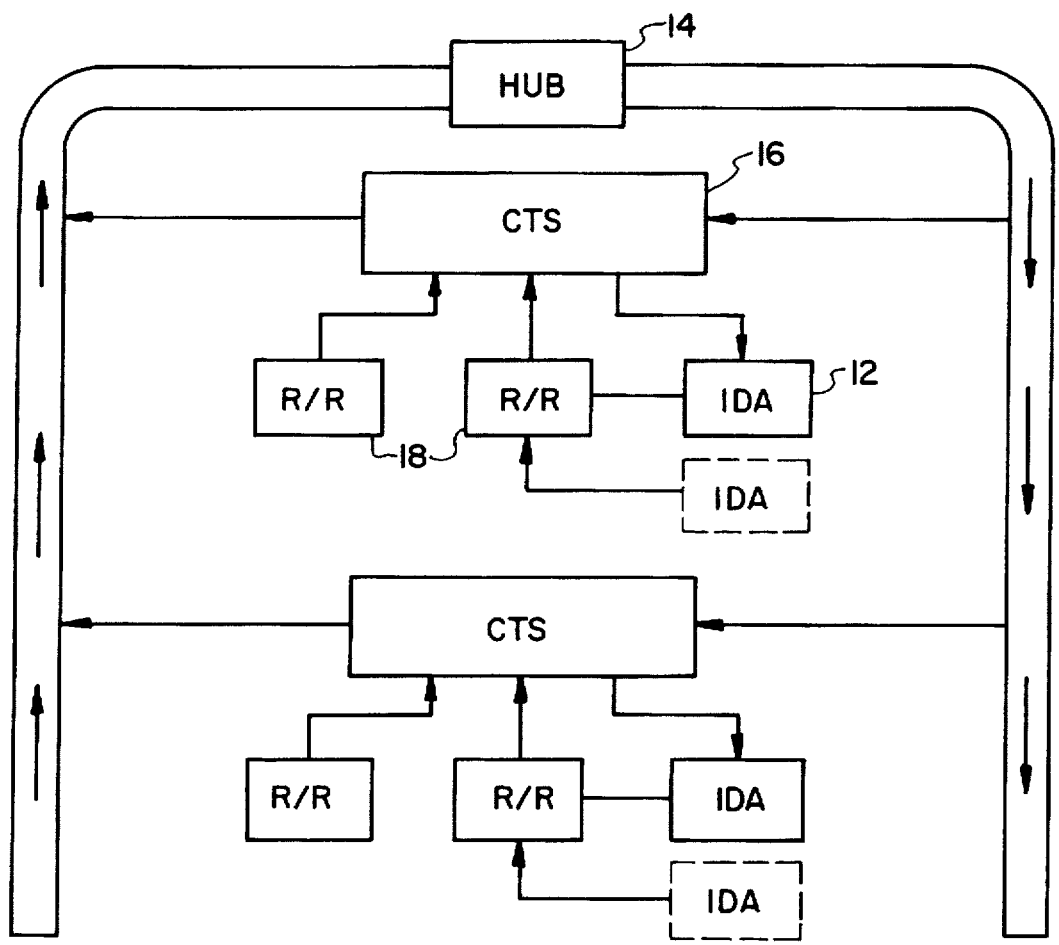
FIG. 5 is a diagram showing the architecture and signal flow for a system including a hub, CTSs, remote receivers and IDAs.

Referring now to FIG. 5, an architecture and signal flow diagram for an interactive two-way data network system including a hub 14, CTSs 16, remote receivers 18 and IDAs 12 is shown. Signaling for this system is based on the Transmission Control Protocol (TCP) and the Internet Protocol (IP) suite of protocols developed by the U.S. Department of Defense. Multiple layers are provided, depending upon particular applications. The RF layer uses a front end computer to provide certain processing tasks. The RF layer also incorporates FEC to correct bit errors. Multiple access to the network with maximized throughput of data is obtained through requests for reservations via a setup channel. Automatic retry occurs at random intervals if a request is not acknowledged.

Again with reference to FIG. 5, the data rate from the hub 14 through the satellite 20 of FIG. 1 to the various CTSs 16 is 512 kilobits per seconds. The data rate from the various CTSs 16 through the satellite 20 to the hub 14 is 128 kilobits per second. Transmissions of data from the hub 14 to individual CTSs 16 use the TCP/IP protocols at data rates of 10 kilobits per second and higher. Transmissions of data from the CTSs 16 to the hub 14 use the TCP/IP protocols at data rates of 30 kilobits per second and higher. Transmission of data from the CTSs 16 to a subscriber, or IDA, 12 in a subdivided response zone 60 of FIG. 2 are at a 12 kilobit per second rate. Transmissions of data from IDA 12 to a remote receiver 18 is at a rate of 6.4 kilobits per second. Transmission of data from the remote receiver unit 18 to the CTS 16 on a dedicated data link also use the TCP/IP protocols. The data rate from the CTS 16 to a IDA 12 is 12 kilobits per second and uses the TCP/IP protocol and an RF protocol for the FCC communication standards for interactive broadcast data service allocating wireless transmissions in the 218–219 MHz band.

Figure 6:
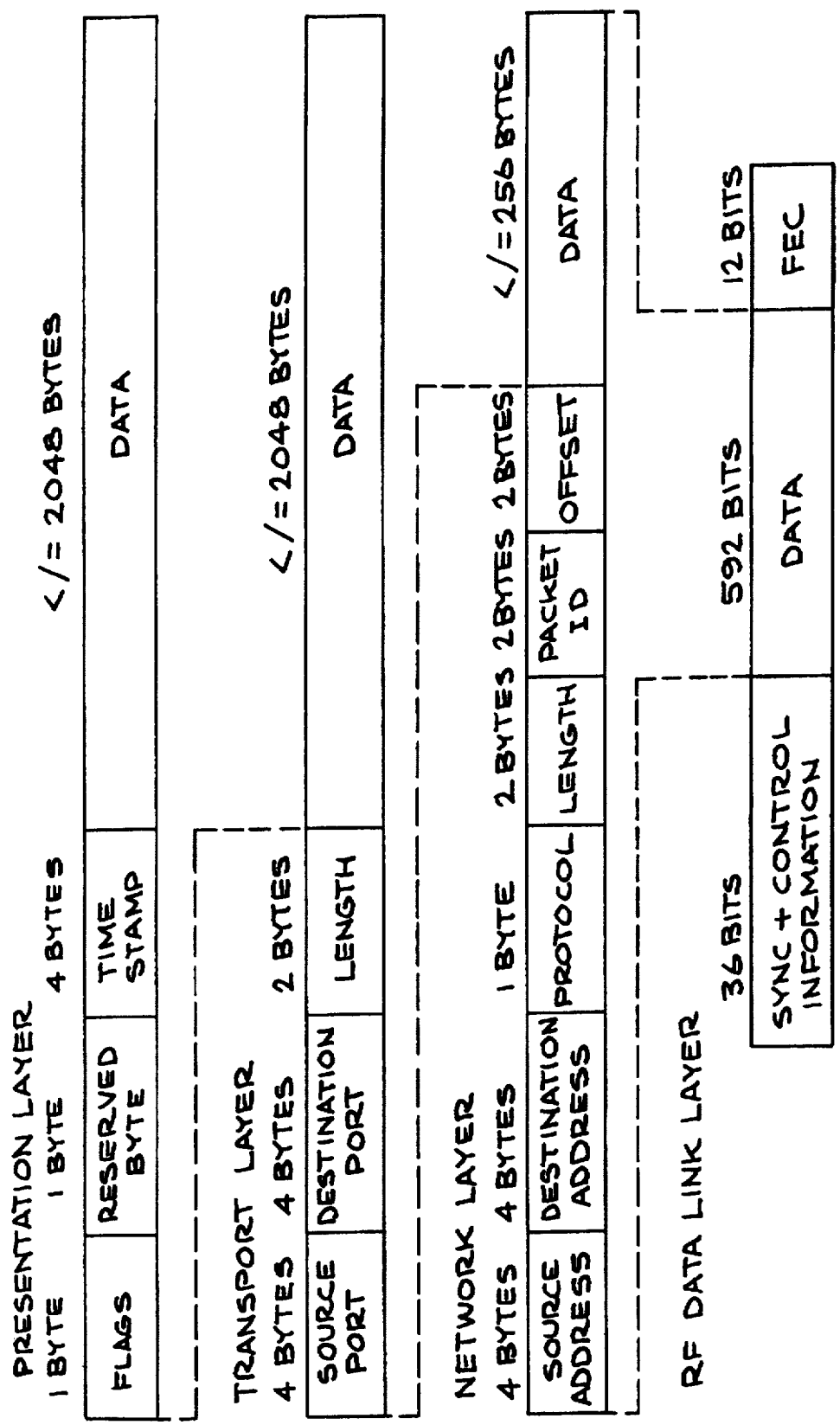
FIG. 6 shows the protocol layers for an interactive broadcast data system according to the invention.

With reference next to FIG. 6, the data units, or frames, for the various protocol layers of the system based upon the TCP/IP protocol suite for an interactive broadcast data system according to the present invention is shown. These frames are shown for a presentation layer, a transport layer, a network layer, and a datalink layer. As indicated by the dotted lines, higher-level frames are encapsulated in the data information field of a lower-level frame. Each frame includes data information bytes and various other bytes as indicated in the Figure.

Referring now to FIG. 7, a diagrammatic view of two adjacently located CTS cells 100, 102 is shown. The CTSs of FIG. 7 are similar to CTS 16 described in connection with FIGS. 1, 2, and 5. The CTSs of FIG. 7 are each shown with antennas suitable for RF transmitter operation at 218–219 MHz. The RF transmitter coverage area, or cell, for CTS 100 is represented by circle 104. Similarly, the Rf transmitter coverage area, or cell, for the CTS 102 is represented by circle 106. Associated with CTS 100 is a remote receiver 108 which has a receive-only RF antenna. Similarly, associated with CTS 102 is a remote receiver 110 which has a receive-only RF antenna. Remote receiver 108 receives RF signals from IDAs located within an area, or cell, defined by the circle 112. Similarly, remote receiver 110 receives RF signals from IDAs located within an area, or cell, defined by the circle 114. Area 116 is simultaneously covered by all of the coverage areas for CTSs 100, 102 and remote receivers 108, 110. A number of these areas may exist for each CTS of a network.

Referring still to FIG. 7, the signaling protocol for a system according to the invention uses time-division-duplexing. In the Broadcast Mode, an outbound signal sends information from a network switching center, or hub, via a satellite link to a CTS, and then to an IDA. In the Response Mode, an inbound signal sends response information from an IDA to a remote receiver, then to a CTS, and then via a satellite link back to the switching center, or hub. IDAs located in the region of overlapping coverage 116, which are located between CTSs 100, 102 receive signals of approximately equal strength from each of the CTSs. If each CTS is permitted to randomly start their broadcast transmissions, interference results if one CTS is in the Broadcast Mode and if the other CTS is in the Response Mode attempting to listen to a response from a IDA on the same frequency.

With reference now to FIG. 8, a chart illustrating the various frequencies used by two adjacent cell CTSs 100, 102 and their respective intermediate remote receivers is shown. For CTS 100 the broadcast frequency is frequency F1. The setup frequency for remote receivers associated with CTS 100 is F1. The respective remote receivers associated with the CTS 100 receive data from respective IDAs on frequencies F2–F14.

Referring again to FIG. 8, for CTS 102 the broadcast frequency is frequency F2. The setup frequency for remote receivers associated with CTS 102 is F2. The respective remote receivers associated with the CTS 102 receive data from respective IDAs on frequencies F3–F14 and F1.

With reference now to FIG. 9, respective timing charts for two unsynchronized, adjacent cell CTSs 110, 102 are shown. If data is received by IDAs in the overlap region 116 of FIG. 7, intermediate receiver 108 receives signals from CTS 110 on F2. The intermediate receiver 108 also receives signals from other IDAs on F2 resulting in severe interference. If IDAs located in the overlap region 116 of FIG. 7 all receive signals from CTSs which are synchronized, for example, to the timing scheme shown in FIG. 9 for CTS 100, then interference at the remote receivers and IDAs due to lack of synchronization can be eliminated.

With reference still to FIG. 9, in one embodiment of the present invention, synchronization is accomplished by using a Global Positioning System GPS system to synchronize all CTSs. In order to reduce interference and to maximize the reuse of the various RF channel frequencies, all of the CTSs are synchronized using a GPS receiver at each CTS to provide a precisely synchronized time stamp. Prior art systems typically have a timing accuracy of 50 milliseconds±20 milliseconds. With a system according to the present invention, timing accuracy of 1 to 4 microseconds is achieved. Using the Global Positioning System (GPS), a precise time stamp is made locally available at each CTS to synchronize a system according to the invention. By synchronizing the start-of-transmission time for all of the CTSs in the system, interference between adjacent CTSs at remote receivers and IDAs is avoided.

Figure 10:
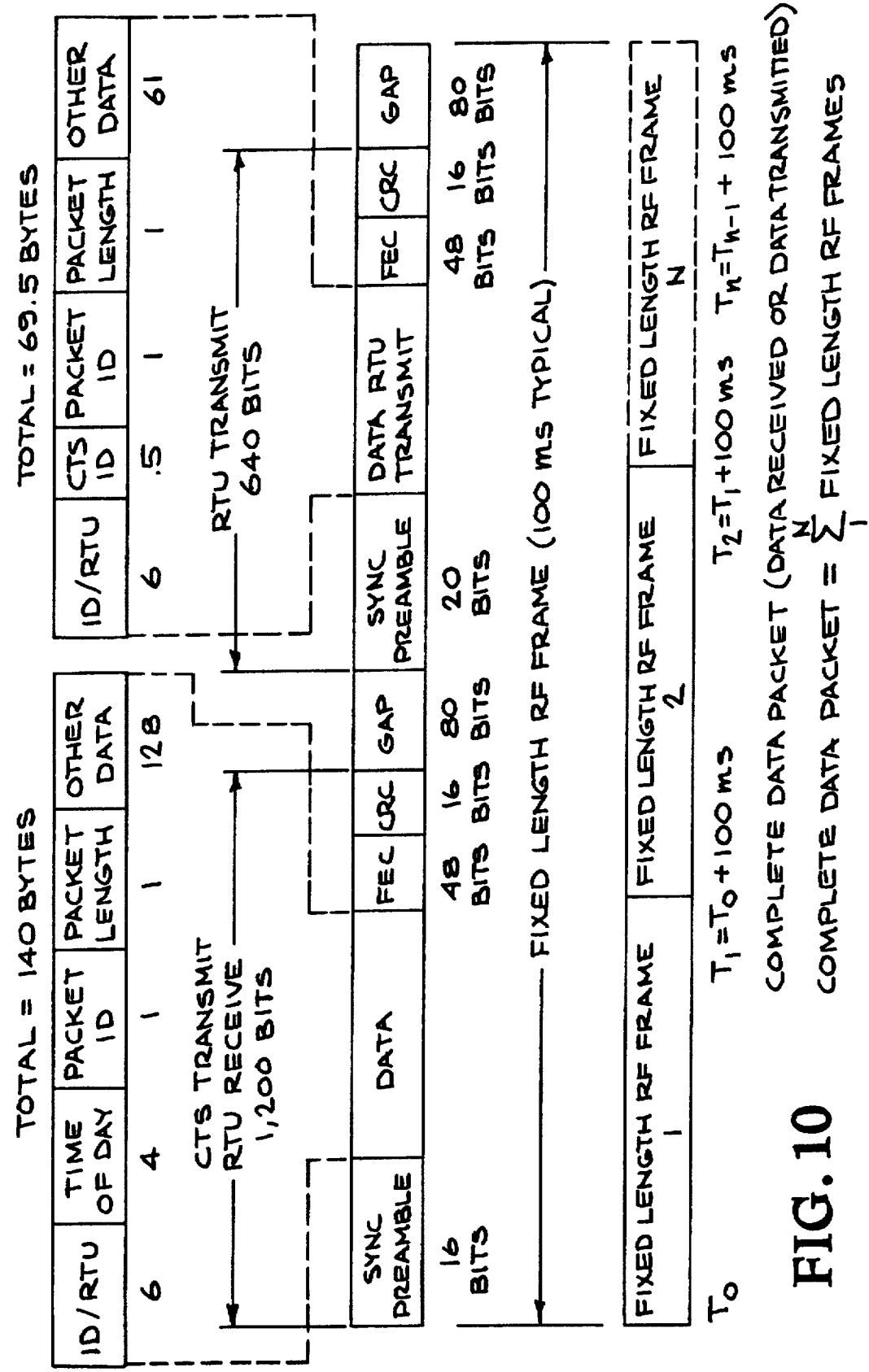
FIG. 10 is a signal diagram showing data pulses and also showing the data pulses on an enlarged scale.

With reference now to FIG. 10, a typical message protocol for a fixed length message frame of 230 bytes of eight bits is shown. This fixed frame length is important in minimizing access time to the system under peak load conditions, since there will be substantially no dead air time incurred while an IDA user is awaiting to be connected or disconnected. Various functional categories are typically included in the broadcast as shown in the blocks. Of note is the IDA ID section which addresses the IDA to be activated (similar to a telephone number), and the Packet ID byte and packet length byte for accumulating a sequence of IDA response frames into a packet. All messages and protocol are consistent with the transmission of data implicitly as part of a broadcast message. However, as will be more particularly set forth later, it is important to synchronize timed data within the nationwide system, even taking into account differences in travel time of radio waves (see U.S. Pat. No. 4,591,906), and for this reason the technique described in U.S. Pat. No. 4,755,871, Jul. 5, 1988 for Control of RF Answer Pulses in a TV Answer Back System may be used to synchronize transmissions with radio broadcast carrier signal from the cell site transmitter and to organize all the multiplexed timing slots for avoiding idle on-air time. Thus, this system departs from any former telephone switching system art which is asynchronously switched.

Figure 11:
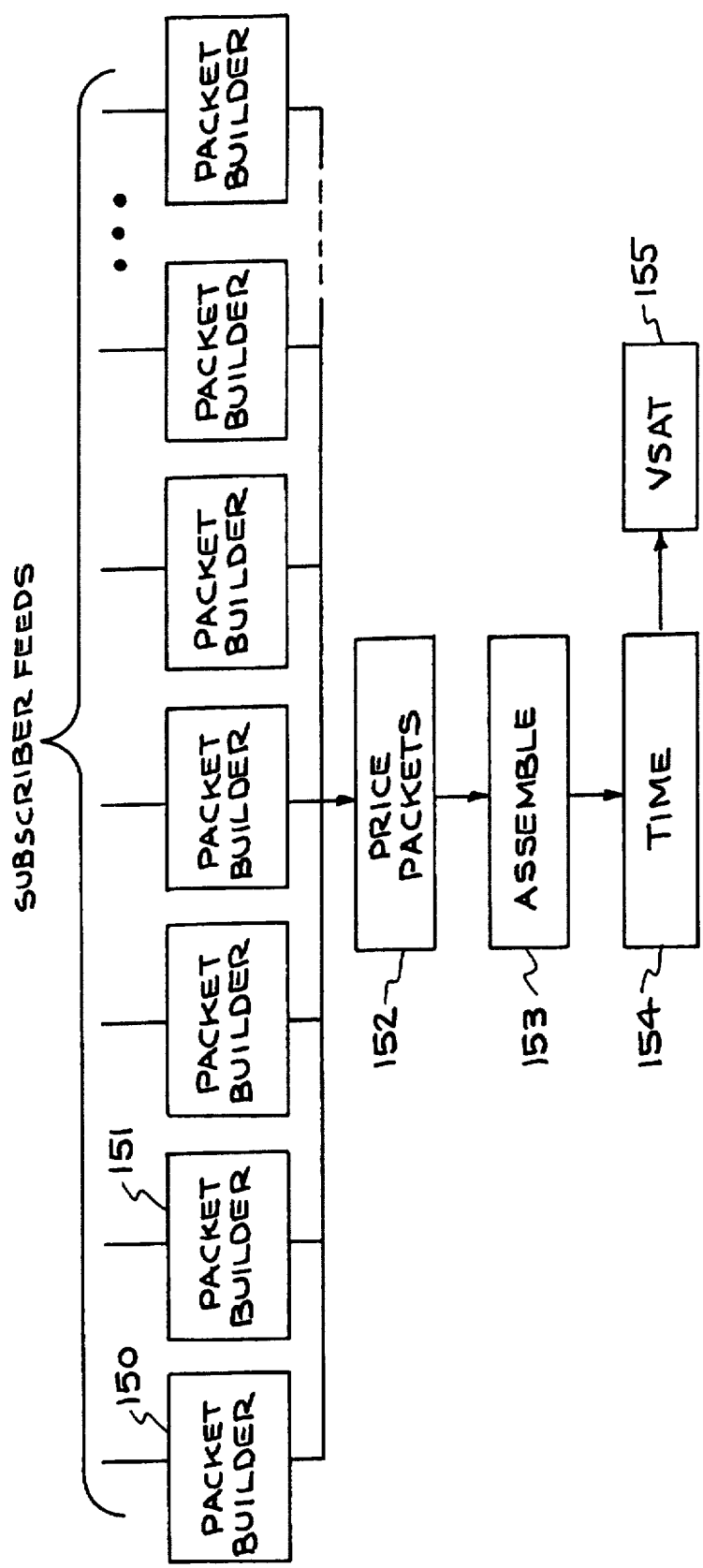
FIG. 11 is a diagrammatic sketch of message frames for illustrating the maximization of data processed at local CTSs.

With reference to FIG. 11, the nationwide transmission of messages longer than 640 bits from IDAs requires several frames of data, with accumulation into packets. The cell site transmission system shown in FIG. 11 processes a set of packets in the manner shown in order to accumulate IDA messages of variable length into a set of serial transmissions for transmitting to the satellite at higher transmission frequency. Accordingly, packet builder circuits (typically shown as 150, 151) are individually assigned to each one of a group of simultaneously active remote receivers until the IDAs variable length message of n 640 bit frames is completed. After pricing in a pricing module 152, the messages are assembled in a module 153, synchronously timed in a module 154, and transmitted to a satellite 155. These accumulated messages are received at the central data station of the hub for switching, adding pertinent data and a receiving address and retransmitting over the satellite at a receiving point such as a further subscriber or a service provider.

Figure 12A:
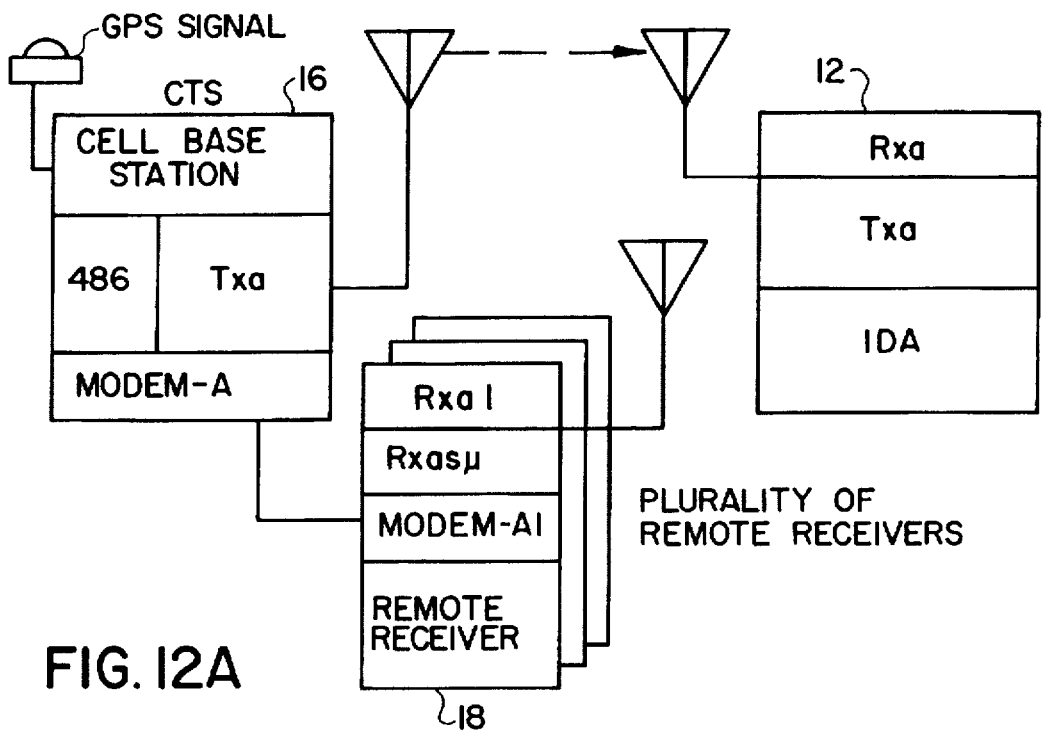
FIG. 12A is a block system diagram of communication channels at a local CTS.
Figure 13:
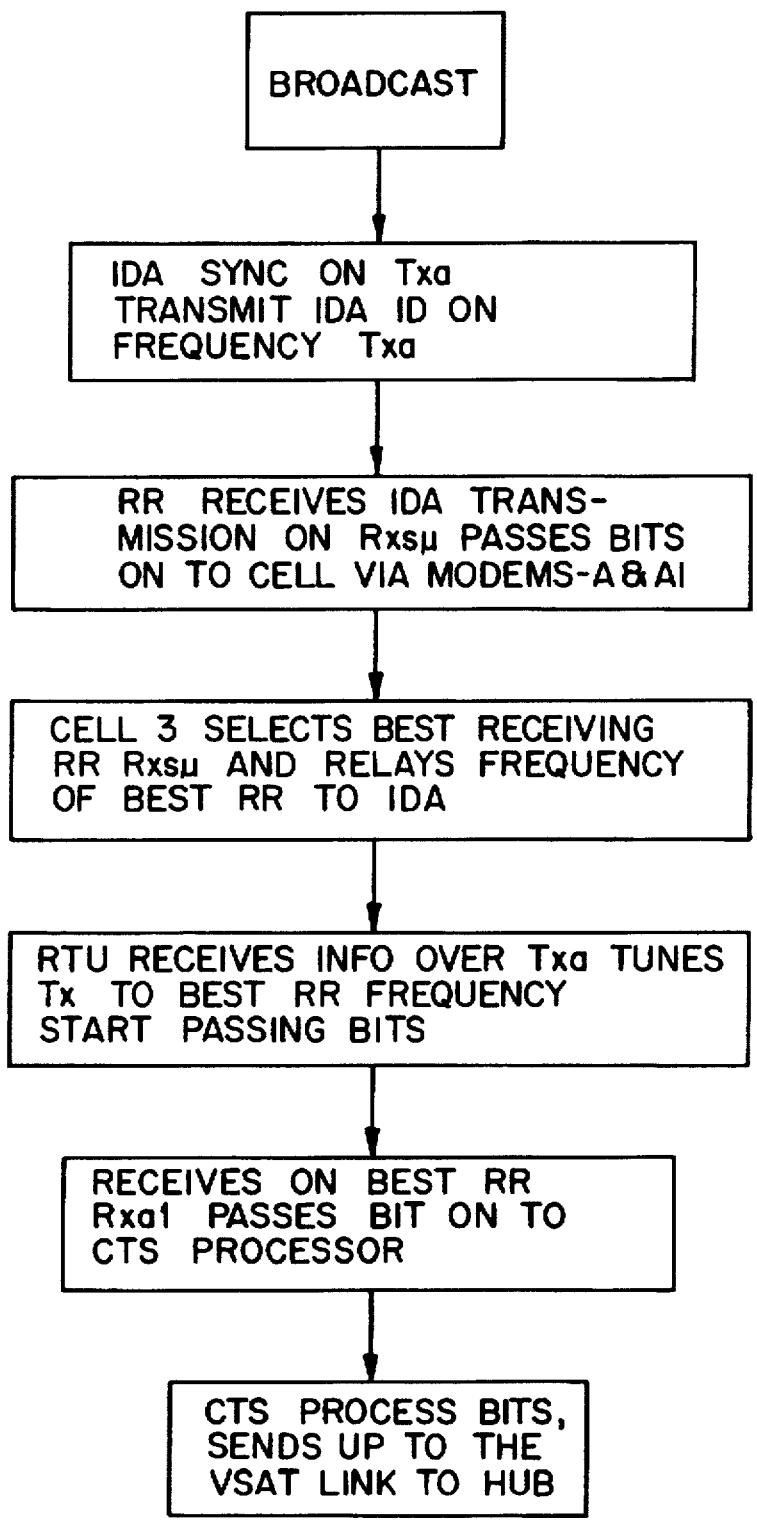
FIG. 13 is a diagrammatic system flow diagram for transmitted messages between IDAs, the cell data center, and the satellite connected network of CTSs for the system of FIG. 13.

With reference now to FIGS. 12A and 13, communication sequences within the limits of local CTS 16 as defined by the outer dotted ring 50 of FIG. 2 are shown. The sequences are between IDA, 12, CTS 16, and plurality of remote receivers 18.

Figure 12B:
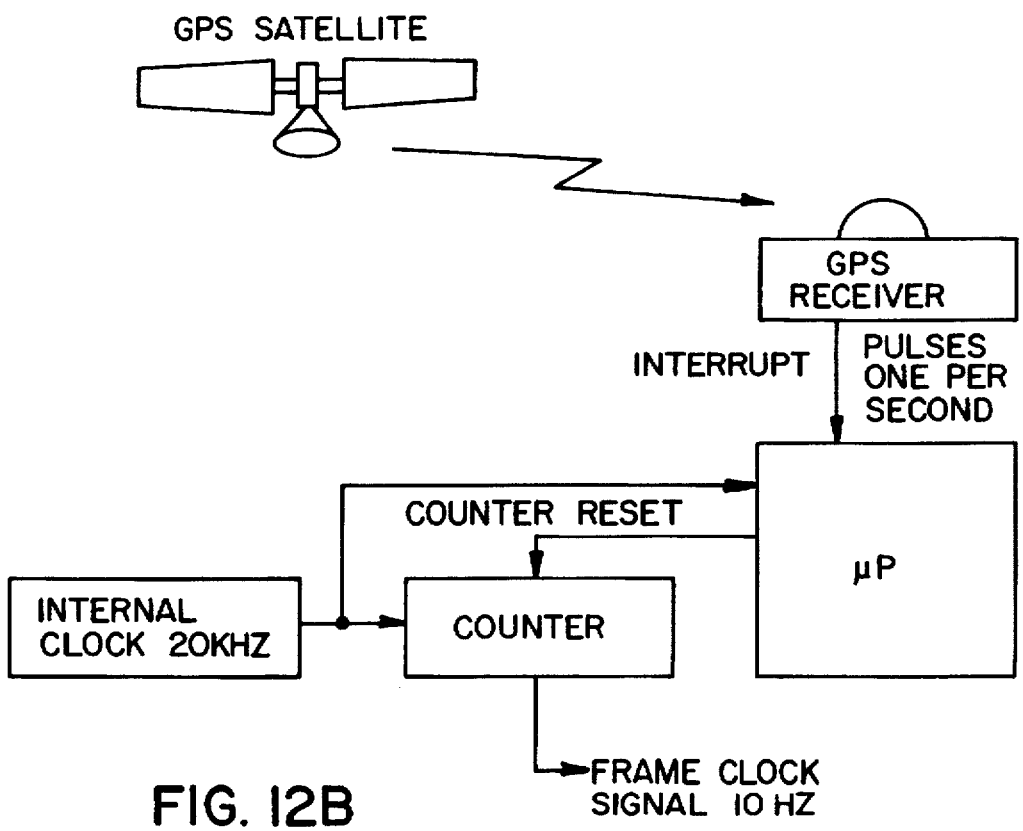
FIG. 12B is a block system diagram showing synchronization with a GPS time stamp of the start time for transmission of data from the local CTS to IDAs.

Referring next to FIG. 12B, synchronization with a GPS time stamp of the start time for transmission of data from the local CTS to the IDAs is schematically shown.

Figure 12C:
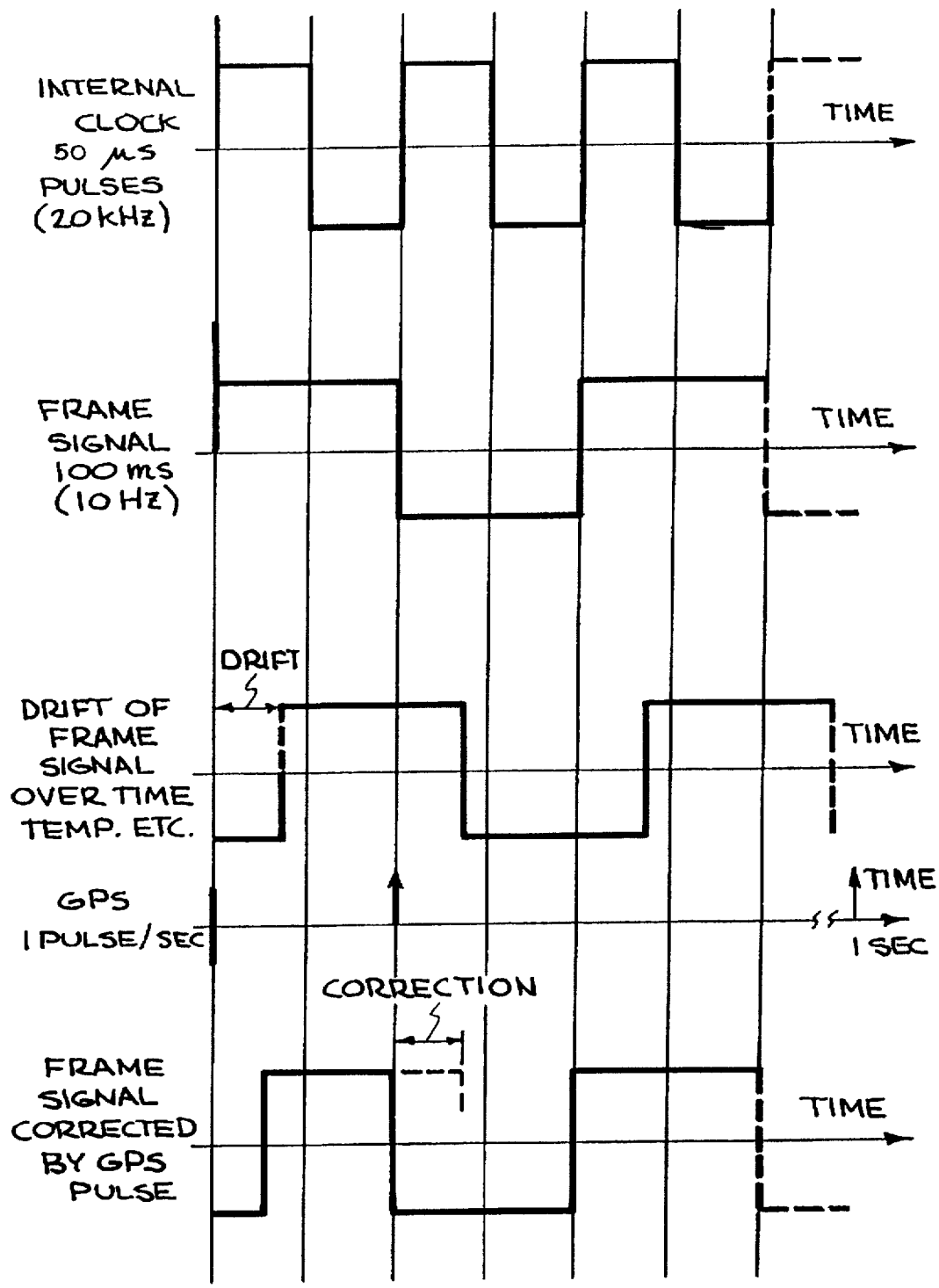
FIG. 12C is a timing diagram showing how synchronization with a GPS time stamp of the start time for transmission of data from the local CTS to the IDAs avoids interference with adjacent CTSs or IDAs timed to the adjacent CTSs.

With reference now to FIG. 12C, a timing diagram is shown. The timing diagram illustrates how synchronization of the start time for transmission of data from the local CTS to the IDAs with a GPS time stamp avoids interference with adjacent CTSs or IDAs timed to the adjacent CTSs.

Referring now to FIG. 13, a data flow chart is shown. The data flow chart depicts "set-up" and response sequences of intercommunications between the respective IDAs, remote fixed-station remote receiver units, and a respective CTS. Synchronization is controlled by modulation of the carrier frequency $Tx_a$ module of the CTS transmitter upon which the IDA locks. Next, the IDA initiates a response which includes both the IDA identification code (ID) and the CTS ID for the purpose of facilitating handoff between CTSs with IDAs or between fringe area cells.

Referring still to FIG. 13, the remote receiver receives the IDAs transmission on its frequency $Rx_{ru}$, and passes an acknowledgment to the CTS for sampling transmission and auditing the transmission routing. Thus, the CTS selects the remote receiver unit that receives the best IDA signal. Note that the remote receiver receives both the transmissions from the CTS transmitter frequency at $Rx_{a1}$ and the communications at its assigned frequency $Rx_{ru}$, and similarly the IDA transmits on two alternative frequencies, one of which is tuned to a particular remote receiver frequency. The CTS then relays the best frequency back to the IDA for tuning in and finishing communications with the best and only remote receiver. This is the end of the "set up" period and the start of the transmission period, during which the message bits are relayed to the CTS by the tuned-in intermediate receiver. The message bits are processed in the CTS and relayed into the network to a central data hub via the VSAT link.

With reference again to FIG. 3, note that the gap 86 between the CTS broadcast interval 82 and the IDA response interval 80 is used for hardware switching during the set up function so that a single frame period covers the procedure of FIG. 13 through the sending of a single frame of the message from the IDA. If transmission conditions change, a succeeding packet from a subscriber thus could be transmitted from a different remote receiver at a different frequency. Thus, the packet ID byte portion of FIG. 10 is significant for reassembling the message frames into a single message packet. The arbitrary cell identification number is similar to a telephone exchange area code designation in the identification of the CTS or the IDAs complete ID address. This set up procedure is important for "hand-off" of a mobile IDA from one stationary remote receiver to another as fringe areas are encountered, such as at borders between two intermediate receiver activity zones, represented by the circles 112, 114 of FIG. 7. Similarly mobile IDAs can move from CTS to CTS when adjacent cells are present such as in urban areas, requiring similar hand-off procedure. The hand-off may be initiated in different ways.

As above described, the CTS may initiate the hand-off of an IDA from an remote receiver in one zone to a second remote receiver in a different zone within the subdivided CTS cell area. Thus, a signal strength (RSSI) measurement may serve as a criterion for hand-off, with the CTS directing the IDA into a set-up routine when signals falling below a threshold, −80 dBm for example, are encountered. Since the IDA stores the message data, it is retained until the set-up procedure is completed in about 2 seconds. Alternately, the IDA software may cause the IDA to place itself in a set-up routine when the RSSI goes below a chosen threshold value, so that the IDA response is transmitted only after setup with a satisfactory CTS or CTS sub-division zone connection of proper signal strength.

When the IDAs are transportable from cell to cell, the packets provided according to FIG. 11 should be sorted at the data processing center of the hub rather than at the CTS level. Each packet carries an identification of the IDA for this purpose and the packet ID is carried in the broadcast frame of FIG. 11 for such processing. Thus, at the central hub a packet of three frames could be derived from two different cells, generally adjacent in geographical relationship. Note the cell ID in the IDA's transmissions (FIG. 11), which is used for control purposes.

With reference again to FIG. 7, the possibility of fringe hand off errors or interfering signals between CTSs is avoided by the allocation of different transmission frequencies for communicating with the geographically adjoining remote receivers in the adjacent CTS areas (104, 106). Thus, in the vicinity of overlapping CTS regions, the related frequencies $f_x$, $f_y$ assigned to adjacent remote receivers 108, 110 may avoid interference problems between remote receivers in different adjacent CTS territories.

Figure 14:
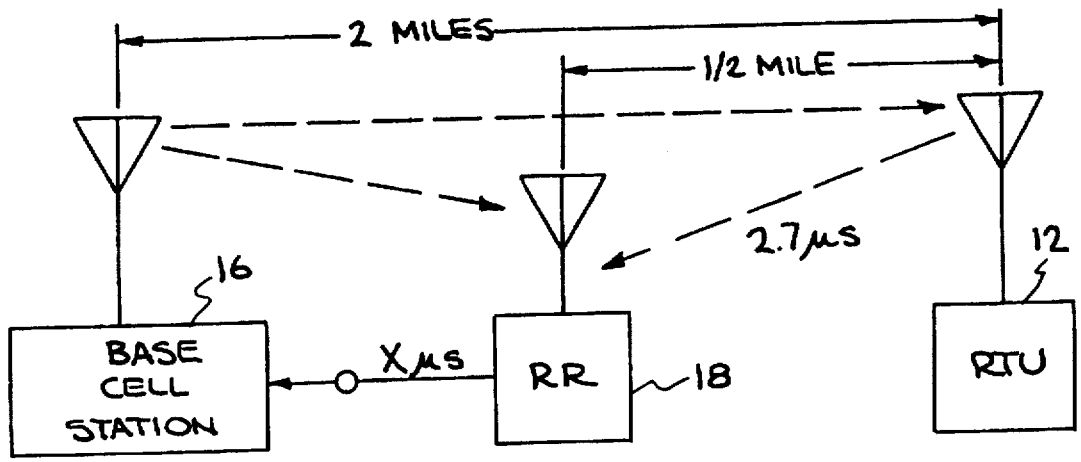
FIG. 14 is a block diagram illustrating transit time characteristics of messages at a CTS.
Figure 15:
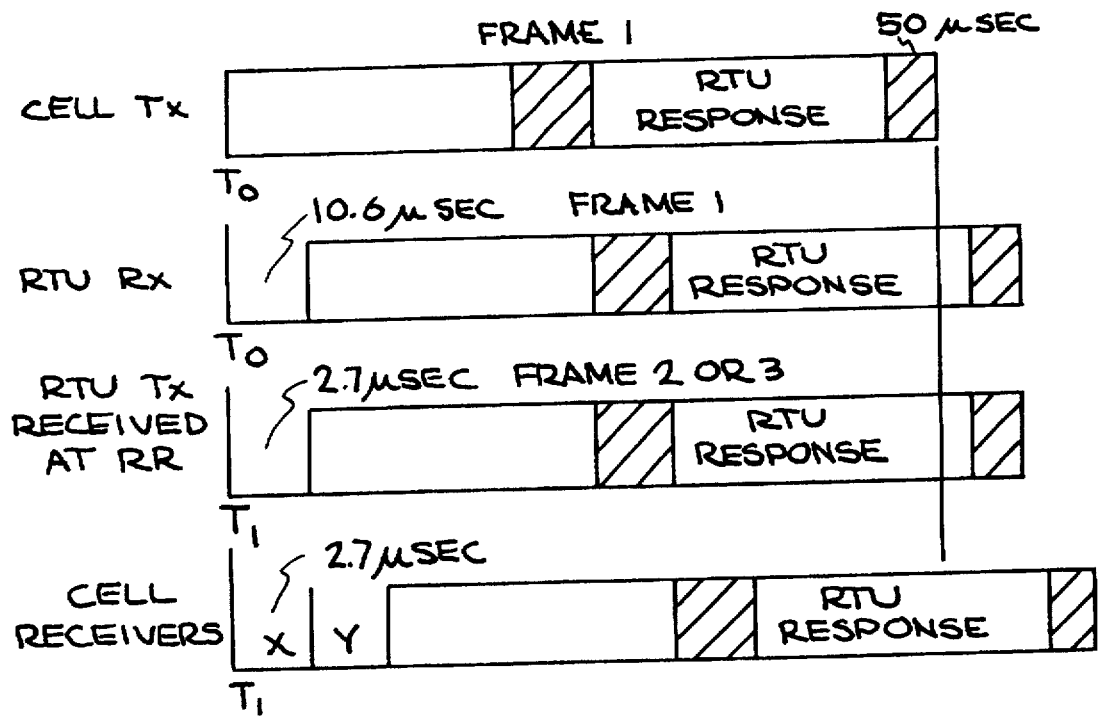
FIG. 15 is a diagrammatic view of typical communication frames showing relative times at different cell site communication stations for the site of FIG. 14.

With reference next to FIGS. 14 and 15, diagrams illustrating critical timings in the messages processed within the CTS site are shown. An example is shown for a CTS site having a 2 mile radius and a remote receiver 18 having a ½ mile radius. Propagation time is 5.3 microseconds per mile. The remote receiver derives bit synchronization and frame synchronization from the signals broadcast by the CTS 16. The IDA 12 derives bit synchronization and frame synchronization from signals broadcast from CTS 16. For keeping the message bits accurately synchronized within the system, the delays in transit time of r-f transmissions must be accounted for. Those transit times are noted in FIG. 14, and the transmitted message frame timings are set forth in FIG. 15. The frames are sequentially separated by a 4 millisecond guard band.

With reference still to FIGS. 14 and 15, there is an approximate 2.7 microsecond delay between IDA 12 and closest remote receiver 18, which is one of approximately ten such remote receivers distributed about the coverage area of CTS 16. This delay is less than 6% of the 50 microsecond signal pulse width and thus no range adjustment is needed for that propagation induced delay. CTS 16 thus adjusts its synchronization with system timing of the received IDA responses after accounting for the approximately two times the 10.6 microsecond delay time for the transmissions to IDA 12 and back to CTS 16.

Figure 16:
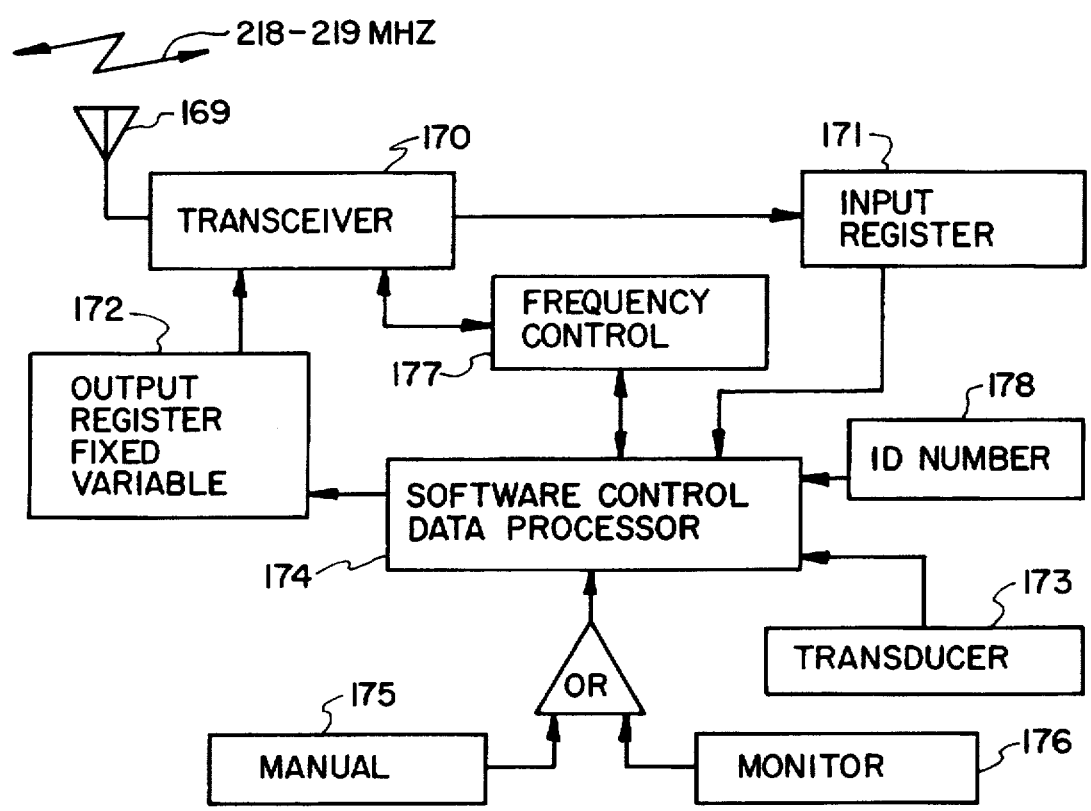
FIG. 16 is a block circuit diagram of an IDA for digital fixed or mobile communication services.

Referring next to FIG. 16 an mobile IDA is illustrated. In the simplified version of FIG. 16, the transceiver 170 and attached antenna 169 permits two-way wireless communications in the 218–219 MHz band and is compatible with the functions herein before set forth. The double headed arrow notation for the radio waves at the antenna signifies two-way wireless communication. For digital communications, an input register 171 is supplied for received digital data. An output register 172 is provided for retaining interactive subscriber entered messages from a transducer 173, which is typically a manual keyboard or a digital sensing instrument. Digital display means may be provided for subscriber viewing of the contents of either one or both registers 171, 172. Thus, a data processor 174, by way of suitable software, controls the system with different modes of operation such as a manual control 175 suitable to keyboard inputting of data from a subscriber, or an automatic monitoring control mode 176 for relaying an alarm or an inventory reading at a subscriber's coin operated vending machine or flow meter.

With reference still to FIG. 16, a frequency control section 177 serves to monitor and set the transmission carrier frequency during set up procedures for transmission to a most favorable fixed intermediate receiver station. Also it serves as the system clock to synchronize the transmission frequency of digital data pulses with the system by means of locking to the synchronizing pulses of the IVDS CTS. A unique identification number 178 is built into each IDA and serves as a screen for incoming messages directed to that IDA (similar to a telephone number), and as an identification of the source of messages sent from an individual subscriber. General software control technology for operation of the IDAs and systems of the disclosed system are known in the art as set forth in more detail in the before mentioned prior patents and patent applications.

With reference again to FIG. 16, the IDA requires some sort of manual input by the user. For example, if a user wishes to order a product, the user must type into the IDA the specifications of his or her selection using keys arranged on the IDA. As another example, if a user wishes to "play-along" with a game show, the user must type his or her answer onto the IDA or push a button corresponding to the user's chosen answer. As such, the level of excitement and some of the complete "interactivity" desired is lost to the user.

Figure 17A:
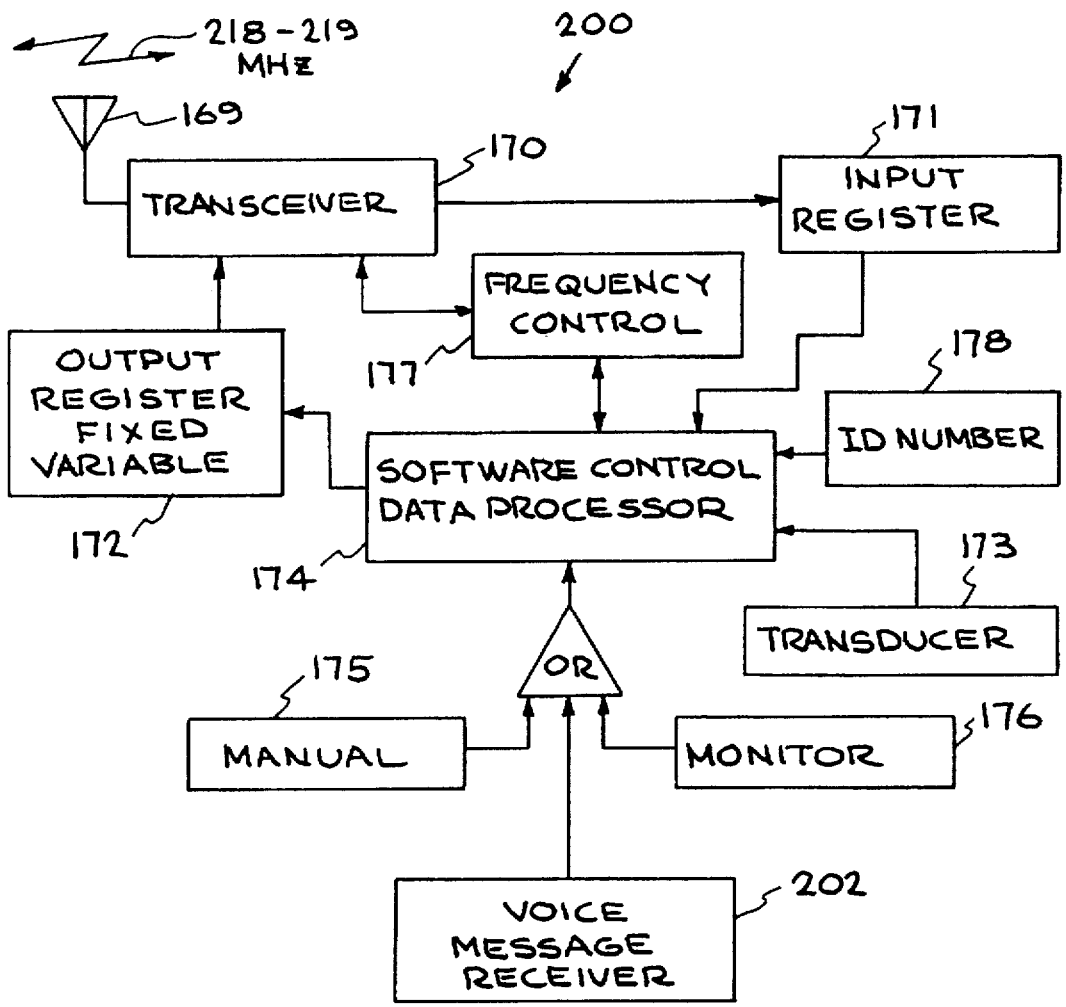
FIG. 17A is a block circuit diagram of an IDA for digital fixed or mobile communication services having a voice message receiver incorporated therein in accordance with the present invention.

With reference next to FIG. 17A, one embodiment of an IDA in accordance with the present invention is shown. IDA 200 includes a voice message receiver 202. Voice message receiver is, for example, a microphone into which a user of IDA 200 recites a voice message. The voice message can include, for example, the specifications of a product which the user wishes to order, or the answer to a game show in which the user is interactively participating or a response to a previously received message. Thus, the present invention provides an IDA 200 which does not require extensive manual input by the user. In so doing, the level of excitement and the "interactivity" of an interactive broadcast data service is substantially enhanced.

Figure 17B:
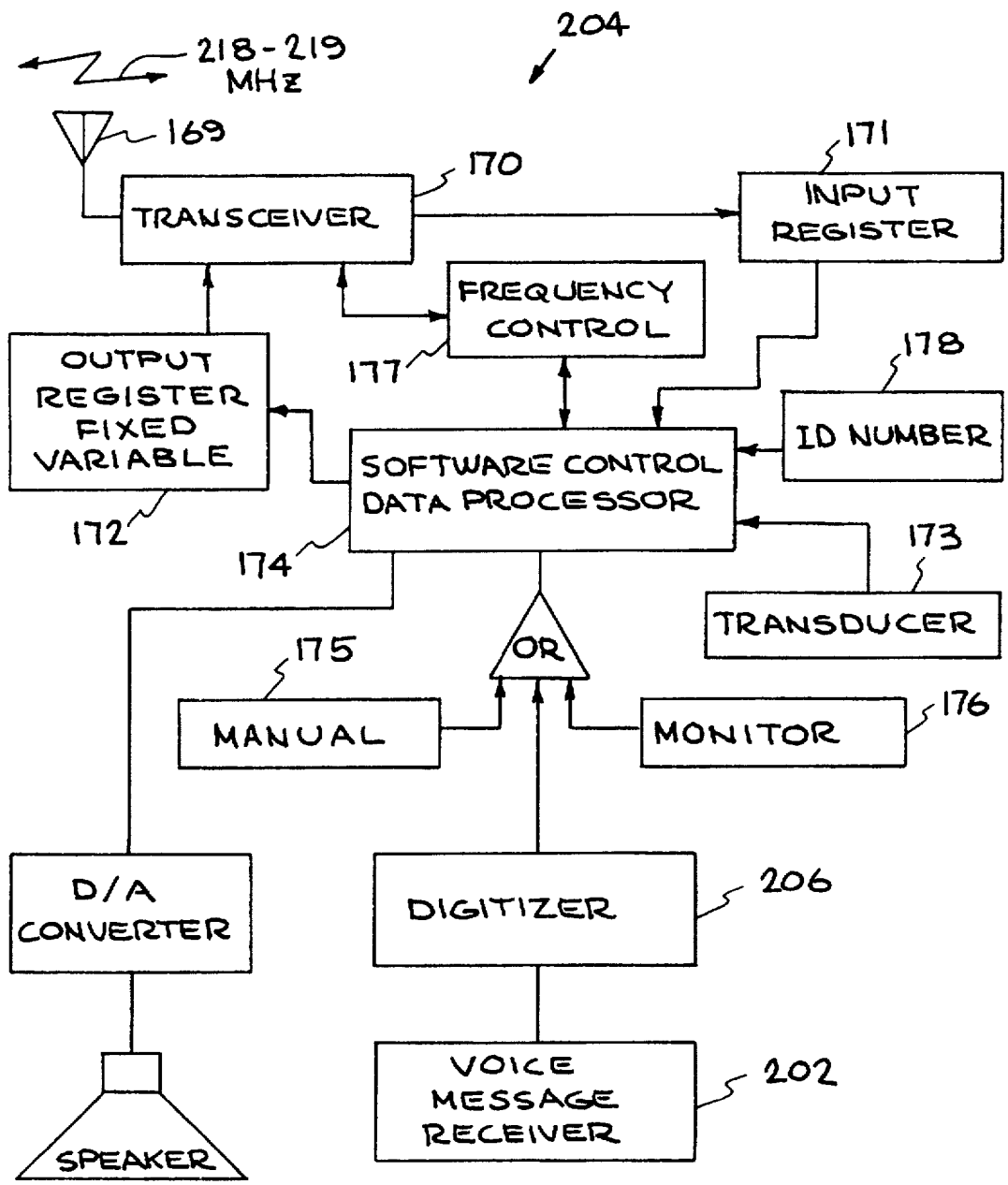
FIG. 17B is a block circuit diagram of an IDA for digital fixed or mobile communication services having a voice message receiver and a digitizer incorporated therein in accordance with the present invention.

With reference next to FIG. 17B, another embodiment of an IDA in accordance with the present invention is shown. IDA 204 includes a voice message receiver 202, and a digitizer 206. Digitizer 206 is, for example, a VOCODER. Normal voice messages contain approximately 4 words per second. Therefore, 10 seconds represents about 40 words or roughly 4 typed lines in standard letter form. When the sampling rate is about 5,000 kHz (twice the frequency to be sample) and each sample is represented by 1 byte, a 10 second message will represent 50 kB of digital information. Using moderate compression techniques (5 to 1) one ten second message would contain 10 kB of digital information. In the present system, approximately 80 bytes per second can be transmitted from the IDA. Thus, a 10 second voice message compressed 5 to 1 would take approximately 7 seconds to transmit. Using available VOCODERS such as found in digitizer 206, the data rate can be reduced by a factor of 3 or more. Using this technique, one would speak short messages into voice message receiver 202, digitizer 206 would digitize and compress the voice message and the user of IDA 204 would direct the IDA to transmit the voice message. The user of the IDA directs the IDA to transmit the voice message by, for example, pushing an "activate" button, not shown, or other similar technique.

Figure 17C:
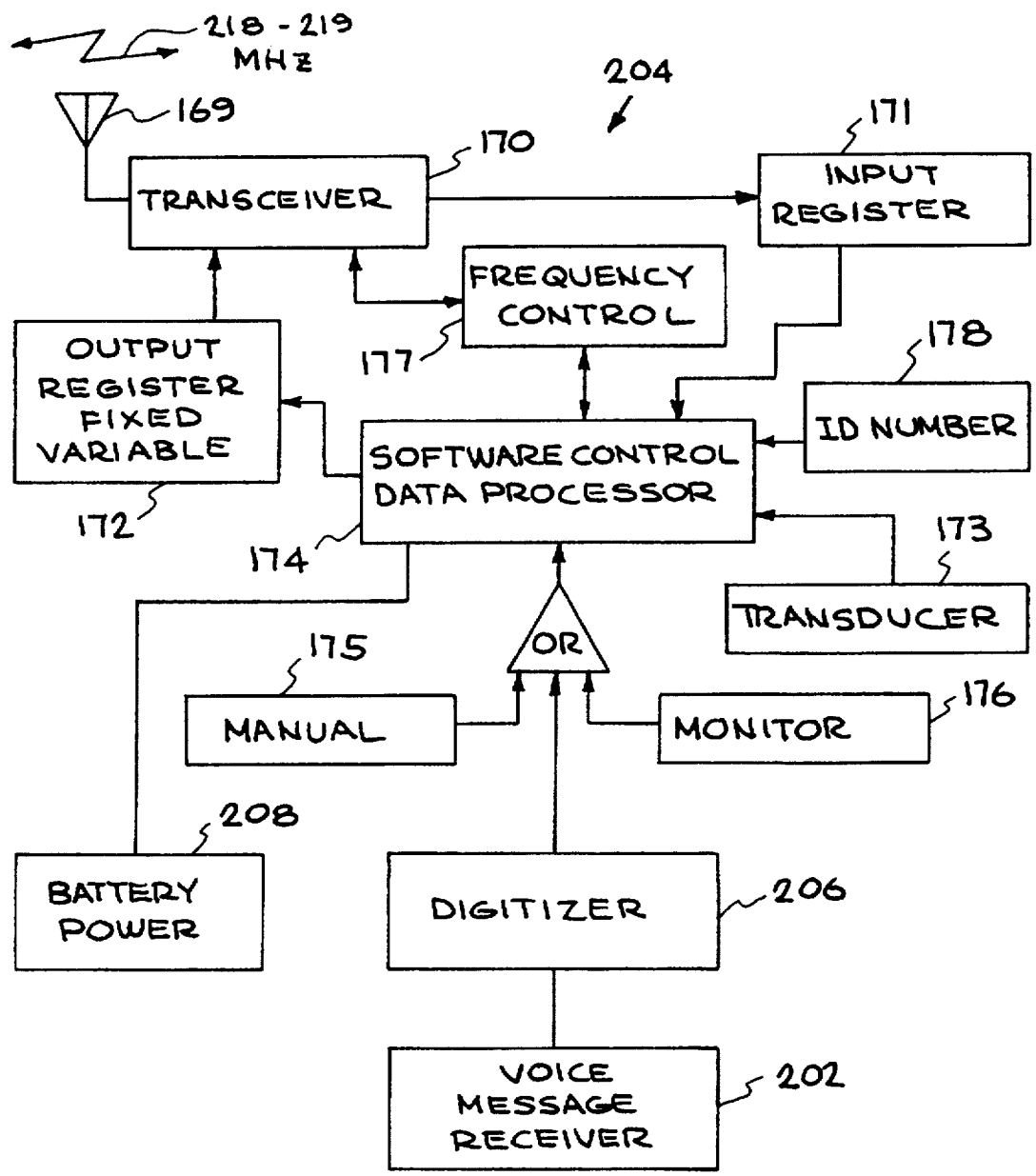
FIG. 17C is a block circuit diagram of an IDA for digital fixed or mobile communication services having a voice message receiver and a battery power source incorporated therein in accordance with the present invention.

With reference again to FIGS. 17A and 17B, the IDA of the present invention provides a number of innovative features and significant advantages in addition to including voice packet messaging. Furthermore, all of the features of the present IDA are compatible with operations within the parameters of a nationwide network of FCC licensed local interactive radio broadcast data service cells, either for interactive communication within the local cell or for interactive communications nationwide over the network. The software controlled data processor 174 makes the utility of the IDA substantially universal in terms of introduction of modes of operation to match with and integrate into machinery or systems and to provide a variety of features interactive use by a user. The simplicity of the digital mode of communication makes the IDA simple, low cost and small in size for ideal mobility and long life when battery powered as shown at item 208 of FIG. 17C. It is of major importance to have the ability in an interactive broadcast data service installation for movement of an IDA for providing full IVDS service and control communication capabilities. A portable battery powered IDA provides such movement.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A method for communicating in a two-way communication system using an interactive data appliance (IDA), wherein said two-way communication system employs at least one central transmitting station (CTS) and at least one local remote receiver that relays messages from said IDA to said CTS, comprising the steps of:

receiving, with an IDA, synchronized signals from a CTS, said synchronized signals being synchronized to a precision clock source;

speaking a voice message into a receiver of said IDA, and transmitting said voice message from said IDA to a remote receiver at a maximum power level in a milliwatt range.

2. The method of claim 1 further comprising the step of transmitting said voice message with a maximum power output in the milliwatt range.

3. The method of claim 1 further comprising the step of digitizing said voice message spoken into said receiver of said IDA.

4. The method of claim 1 further comprising the step of transmitting said voice message to said remote receiver on a carrier frequency band in the order of approximately 218 MHz.

5. The method of claim 1 further comprising the step of transmitting said voice message to said remote receiver on a plurality of frequency bands.

6. A method according to claim 1, wherein said precision clock source is a time stamp signal transmitted by a global positioning system.

7. An interactive data appliance (IDA) adapted for use in a two-way communication system employing at least one central transmitting station (CTS) and at least one local remote receiver that relays messages from said IDA to said CTS, said at least one IDA comprising:

a receiver receiving synchronized signals from a CTS, said synchronized signals being synchronized to a precision clock source;

means for receiving voice messages from a user of said at least one IDA, and a transmitter for transmitting said voice messages from said at least one IDA to a remote receiver, wherein said transmitter has a maximum power output in a milliwatt range.

8. The interactive data appliance of claim 7 wherein said at least one IDA further includes digitizing means for digitizing said voice messages of said user received by said at least one IDA.

9. The interactive data appliance of claim 8 wherein said transmitter is further comprised of a digital transmitter for transmitting said digitized voice messages of said user.

10. The interactive data appliance of claim 7, wherein said transmitter operates on a carrier frequency band in the order of approximately 218 MHz.

11. The interactive data appliance of claim 7 wherein said interactive data appliance is a battery operated portable unit.

12. The interactive data appliance of claim 7 wherein each of said at least one IDAs has a unique identification number such that each of said at least one IDAs can be differentiated from a plurality of other IDAs by said CTS, such that each of said at least one IDAs can be exclusively selected to receive a message from said CTS.

13. The interactive data appliance of claim 7 further including means for transmitting messages to a local remote receiver and said CTS on a plurality of frequency bands.

14. The interactive data appliance of claim 7 further including means for responding to a request transmitted from said CTS for said at least one IDA to set up conditions for a return transmission of a message from said at least one IDA to said CTS.

15. The interactive data appliance of claim 14 further including set up means for selecting a transmission path for said return transmission of said message from said at least one IDA to said CTS.

16. An interactive data appliance according to claim 7, wherein said precision clock source is a time stamp signal transmitted by a global positioning system.

17. A two-way communication system comprising:

at least one low power mobile interactive data appliance (IDA) located in at least one of a plurality of geographic zones of at least one geographic area, said at least one IDA further including:

means for receiving voice messages from a user of said at least one IDA, and means from transmitting said voice messages from said at least one IDA, a remote receive only station disposed within said at least one of said plurality of geographic zones for reception of transmissions including said voice messages from said at least one IDA located in said at least one of said plurality of geographic zones, a central transmitting station (CTS) disposed within said at least one geographic area, said CTS communicatively coupled to said receive only station disposed within said at least one of said plurality of geographic zones, said CTS having data processing and transmission facilities for transmitting to said at least one IDA and for receiving from said receive only station multiplexed synchronously related digital data messages of variable lengths, said data processing and transmission facilities including means for synchronizing said transmission facilities with a precision clock signal derived from an independent precision clock source, and facilities in said CTS and said at least one IDA for handing off communications between said plurality of geographic zones when communicated signals deteriorate below a given threshold.

18. The two-way communication system of claim 17 wherein said at least one IDA further includes digitizing means for digitizing said voice messages of said user received by said at least one IDA.

19. The two-way communication system of claim 17 wherein said at least one IDA is battery powered.

20. The two-way communication system of claim 17 wherein said CTS further includes:

means for receiving said digitized voice messages generated by said at least one IDA, and means for decoding said digitized messages.

21. The two-way communication system of claim 17 wherein the system operates in conjunction with a source of video broadcast signals and wherein said CTS data processing and transmission facilities includes means for synchronizing said transmission facilities with a precision clock signal which is derived from a precision clock source, which clock source is independent of said video broadcast signals.

22. The two-way communication system of claim 21 wherein the precision clock source includes means for providing the precision clock signal from a Global Positioning System (GPS) network to provide precision timing for said CTS transmission facilities.

23. The two-way communication system of claim 17 wherein CTS data processing and transmission facilities include means for receiving signals from a Global Positioning System (GPS) satellite to provide the precision clock signal for precision timing of said CTS transmission facilities.

24. The two-way communication system of claim 17 further comprising means for transmitting messages from different geographic areas on different carrier frequencies.

25. The two-way communication system of claim 17 further comprising a transmitter for conveying messages from said CTS to said at least one IDA on a carrier frequency of substantially 218 MHz.

26. The two-way communication system of claim 17 wherein said at least one IDA transmits with maximum power in the milliwatt range.

27. The two-way communication system of claim 17 wherein each of said at least one IDAs is individually identified by reception and transmission of digital signal pulses in a predetermined timing relationship synchronized with said precision clock signal.

28. The two-way communication system of claim 17 further comprising facilities for handing off communications from said at least one IDA within a first geographic area of a first CTS to a second CTS in a second geographic area when said first and second geographic areas overlap.

* * * * *